(12) United States Patent
Phifer

(10) Patent No.: US 10,463,020 B2
(45) Date of Patent: Nov. 5, 2019

(54) DISPOSABLE ANIMAL BATHING AND GROOMING APPARATUS

(71) Applicant: Kengilo Deangilo Phifer, Liburn, GA (US)

(72) Inventor: Kengilo Deangilo Phifer, Liburn, GA (US)

( * ) Notice: Subject to any disclaimer, the term of this patent is extended or adjusted under 35 U.S.C. 154(b) by 168 days.

(21) Appl. No.: 15/365,136

(22) Filed: Nov. 30, 2016

(65) Prior Publication Data

US 2018/0146642 A1    May 31, 2018

(51) Int. Cl.
*A01K 13/00* (2006.01)
*A01K 15/04* (2006.01)

(52) U.S. Cl.
CPC ............ *A01K 13/001* (2013.01); *A01K 15/04* (2013.01)

(58) Field of Classification Search
CPC ....... A01K 1/011; A01K 13/001; A01K 15/04
USPC ................. 119/665, 673, 676, 161, 166, 168
See application file for complete search history.

(56) References Cited

U.S. PATENT DOCUMENTS

| | | | |
|---|---|---|---|
| 3,749,064 A | 7/1973 | Weinstein et al. | |
| 3,925,828 A * | 12/1975 | Kim ...................... | A47K 3/325 135/157 |
| 4,083,328 A | 4/1978 | Baker | |
| 4,730,576 A * | 3/1988 | Yoshikawa .......... | A01K 13/001 119/673 |
| 4,741,289 A * | 5/1988 | Blose ................... | A01K 13/001 119/671 |
| 4,782,792 A * | 11/1988 | Anthony .............. | A01K 13/001 119/665 |
| 4,932,360 A * | 6/1990 | O'Connor ............ | A01K 1/0125 119/168 |
| 5,060,597 A | 10/1991 | Fredericks | |
| 5,152,612 A * | 10/1992 | Shoemaker .............. | A41D 3/00 383/4 |
| 5,213,064 A * | 5/1993 | Mondine .............. | A01K 13/001 119/671 |
| 5,373,814 A * | 12/1994 | Seymour .............. | A01K 1/0263 119/795 |
| 5,974,601 A * | 11/1999 | Drane .................... | A47K 3/001 4/539 |
| 7,047,577 B1 * | 5/2006 | Cirilli .................... | A47K 3/325 4/599 |
| 7,080,608 B1 * | 7/2006 | Arndt ................... | A01K 13/001 119/665 |

(Continued)

*Primary Examiner* — Lisa L Tsang
(74) *Attorney, Agent, or Firm* — Incorporating Innovation LLC; Charlena Thorpe, Esq.

(57) ABSTRACT

A disposable animal bathing and grooming apparatus for the hygienic cleaning of animals is provided. The apparatus may include a collapsible disposable container removably supported in an upright condition by a frame. The disposable container provides a cavity for receiving an animal, wherein a filter is provided along a lower portion thereof. The disposable container is configured to selectively capture and/or directedly discharge animal waste wherein the animal's body is fully accessible to direct contact during bathing/grooming. The disposable container provides an integrated pouch. The frame is movable between an upright configuration and a collapsed configuration for easy storage. The disposable container may be collapsed into its pouch for disposal of all the animal waste deposited therein during the bathing and grooming process.

11 Claims, 5 Drawing Sheets

(56) References Cited

U.S. PATENT DOCUMENTS

| | | | | |
|---|---|---|---|---|
| 7,219,625 B2* | 5/2007 | Powers | ............... | A01K 13/001 |
| | | | | 119/651 |
| 7,421,978 B2* | 9/2008 | Price | ................... | A01K 13/001 |
| | | | | 119/604 |
| 7,984,697 B2* | 7/2011 | Grbic | ...................... | A01K 1/04 |
| | | | | 119/756 |
| 8,056,146 B2* | 11/2011 | Porowski | ........... | A41D 13/1209 |
| | | | | 2/247 |
| 8,069,821 B1* | 12/2011 | Green | ................ | A01K 13/001 |
| | | | | 119/671 |
| 8,186,308 B1* | 5/2012 | Hluben | ................ | A01K 13/001 |
| | | | | 119/676 |
| 8,307,787 B2 | 11/2012 | Tarasuk et al. | | |
| 2006/0102096 A1* | 5/2006 | Cho | .................... | A01K 13/001 |
| | | | | 119/671 |
| 2007/0074674 A1* | 4/2007 | Miller | .................. | A01K 13/001 |
| | | | | 119/671 |
| 2007/0289548 A1* | 12/2007 | Smoot | ................. | A01K 13/001 |
| | | | | 119/668 |
| 2008/0295781 A1* | 12/2008 | Huang | ................ | A01K 13/001 |
| | | | | 119/673 |
| 2011/0061602 A1* | 3/2011 | Moharram | ........... | A01K 13/001 |
| | | | | 119/651 |
| 2013/0192530 A1* | 8/2013 | Lovenvirth | ............ | A01K 1/011 |
| | | | | 119/163 |
| 2014/0090147 A1* | 4/2014 | Tyler | ........................ | A45F 4/12 |
| | | | | 2/69 |
| 2015/0313377 A1* | 11/2015 | Davis | .................... | A01K 13/00 |
| | | | | 5/655 |
| 2016/0128302 A1* | 5/2016 | Stauber | ................ | A01K 13/001 |
| | | | | 119/671 |

* cited by examiner

DISPOSABLE ANIMAL BATHING AND GROOMING APPARATUS

BACKGROUND OF THE INVENTION

The present invention relates to a disposable animal washing apparatuses and, more particularly, to an animal bathing and grooming apparatus for the hygienic cleaning of animals.

The process of bathing and/or grooming an animal exposes the user and the process's surrounding areas to the following unsanitary animal bathing and/or grooming waste: fur, dead animal skin, dirty liquid runoff, germs, animal urine and feces, and the like. Therefore, the user is left with surrounding areas which must be properly washed and sanitized to return them to an orderly state of healthy cleanliness, after hygienically cleaning the animal.

Current systems used to bathe and/or groom animals, unfortunately, have many disadvantages for the animals and the bather/groomers.

A disadvantage of current systems is they do not shield the surrounding areas from such cleaning and grooming waste.

Another disadvantage of current systems is they are non-disposable and require post cleanup and sanitation effort, which adds significant amounts of time and effort to the bathing and/or grooming process.

Another disadvantage of current systems is they are bulky and/or rigid, and so when it is necessary to move the animal bathing and/or grooming location, users must contend with current solutions, which are not designed for easy portability nor space-saving storage.

Another disadvantage of a reusable animal washing device such as U.S. Pat. No. 3,749,064 is the need to clean the apparatus of animal hair and dirt after the animal has been bathed.

Another disadvantage of reusable animal washing devices such as U.S. Pat. No. 4,083,328 is the storage room required to store the apparatus.

Another disadvantage of using a device which encloses an animal such as U.S. Pat. No. 8,307,787 B2 is securing a bag around the neck of an animal creates a hazard if the animal becomes mobile and harms itself while attempting to escape from the enclosure attached to its neck.

Another disadvantage of disposable animal bathing devices which contain pretreated bathing solutions (i.e. shampoo, conditioners, medications, pest control agents, scents, etc.) such as U.S. Pat. No. 8,307,787 B2 is they eliminate the ability of the caregiver to select bathing solutions which address an animal's specific need.

Another disadvantage of using a device which eliminates direct access to an animal by enclosing the animal such as U.S. Pat. No. 8,307,787 B2 is the device eliminates the ability of the bather/groomer to use common bathing and grooming tools (i.e. brushes, de-shedders, combs, blow dryers, etc.) which provide effective grooming and bathing results.

Another disadvantage of using a device which eliminates direct access to an animal by enclosing the animal such as U.S. Pat. No. 8,307,787 B2 is the device adds involvedness by requiring the bather/groomer to disengage its enclosure mechanism whenever direct access to the animal is required.

Another disadvantage of using a device which completely encloses an animal such as U.S. Pat. No. 8,307,787 B2 is in its enclosed configuration bathers are limited by the amount of water they can use to clean an animal. Specially, if the amount of water to clean an animal is greater than the containers capacity to contain water then the bather/groomer will have to stop the bathing/grooming process and replace the disposable container with a new container.

Another disadvantage of using a device which allows cleaning runoff to come into contact with its surrounding area; such as certain configurations of U.S. Pat. No. 8,307,787 B2 which allows run-off through the bottom of the disposable bag to come into contact with the surrounding surface, is the surrounding area will require significant cleaning effort to bring the surrounding area into a state of healthy cleanliness.

As can be seen, there is a need for a disposable animal bathing and grooming apparatus for the hygienic cleaning of animals that shields the surrounding workspace and bather/groomer by way of a disposable container that facilitates the containment, filtering and funneling of animal bathing and grooming waste to an appropriate disposal location during the animal bathing and/or grooming process thereby eliminating the need for post bathing and/or grooming waste cleanup. Furthermore, the shielding apparatus needs to allow complete and direct access to the animal being bather/groomed and must be light-weight and compact for convenient portability and economical storage.

SUMMARY OF THE INVENTION

In one aspect of the present invention, the disposable animal bathing and grooming apparatus for the hygienic cleaning of animals includes: a frame movable between an upright configuration and a collapsed configuration have a planar orientation; a disposable bag extending from a lower portion to an opening removably attached along an upper portion of the frame; a restraint device connected to the upper portion of the frame so as to be adjacent to and upward relative to the opening in the upright configuration, wherein the restraint device is adapted to restrain an animal; and a filter provided along a lower portion for the disposable bag, wherein the filter fluidly communicates there with, and wherein the filter is dimensioned and adapted to either allow or prevent solid animal waste of the animal from passing therethrough.

In another aspect of the present invention, the animal bathing and grooming apparatus for the hygienic cleaning of animals includes a frame providing an upper horizontal frame; a lower horizontal frame; and a plurality of vertical members pivotally interconnecting the upper and the lower horizontal frames so that the frame is movable between an upright configuration and a collapsed configuration have a planar orientation; a disposable container extending from a lower portion to an upper portion so as to define a cavity, the upper portion providing an opening to the cavity, wherein a periphery of the upper portion removably attaches along the upper horizontal frame; a restraint device connected to the upper horizontal frame so as to be adjacent to and upward relative to the opening in the upright configuration, wherein the restraint device is adapted to restrain an animal; and a filter provided along the lower portion, wherein the filter fluidly communicates with the cavity, and wherein the filter is dimensioned and adapted to either allow or prevent solid animal waste of the animal from passing therethrough.

In yet another aspect of the present invention, the animal bathing and grooming apparatus for the hygienic cleaning of animals includes a frame providing: an upper horizontal frame; a lower horizontal frame; a plurality of vertical members pivotally interconnecting the upper and the lower horizontal frames so that the frame is movable between an upright configuration and a collapsed configuration have a planar orientation; and a plurality of detachable connectors provided by each horizontal frame, so that each horizontal frame is movable between an operable configuration and a storage configuration separated into two separate portions; a disposable container extending from a lower portion to an upper portion so as to define a cavity, the upper portion providing an opening to the cavity; a retaining member dimensioned to removably sandwich the upper portion of the disposable container along a periphery of the upper horizontal frame; a sprayer holder connected to the upper horizontal frame so as to be adjacent to and upward relative to the opening in the upright configuration; a restraint device connected to the upper horizontal frame so as to be adjacent to and upward relative to the opening in the upright configuration, wherein the restraint device is adapted to restrain an animal; a filter wherein the filter is dimensioned and adapted to either allow or prevent solid animal waste of the animal from passing therethrough; a void provided along the lower horizontal frame, wherein the upright configuration the void aligns with the filter; and a pouch integrated into the disposable container, wherein the disposable container is collapsible into the pouch for sanitary disposal of the disposable bag and its animal waste contents.

These and other features, aspects and advantages of the present invention will become better understood with reference to the following drawings, description and claims.

DETAILED DESCRIPTION OF THE INVENTION

Figure 1:
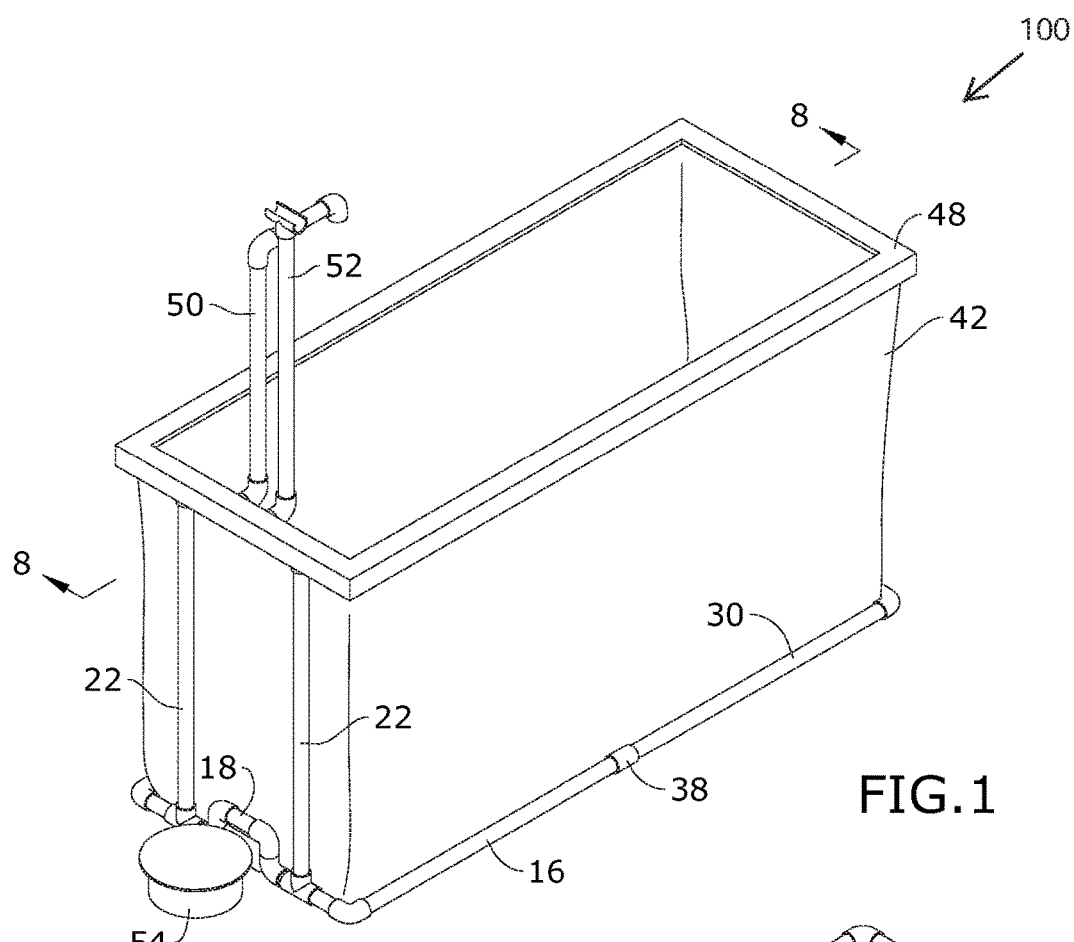
FIG. 1 is a perspective view of an exemplary embodiment of the present invention, shown in the upright condition and configuration.
Figure 2:
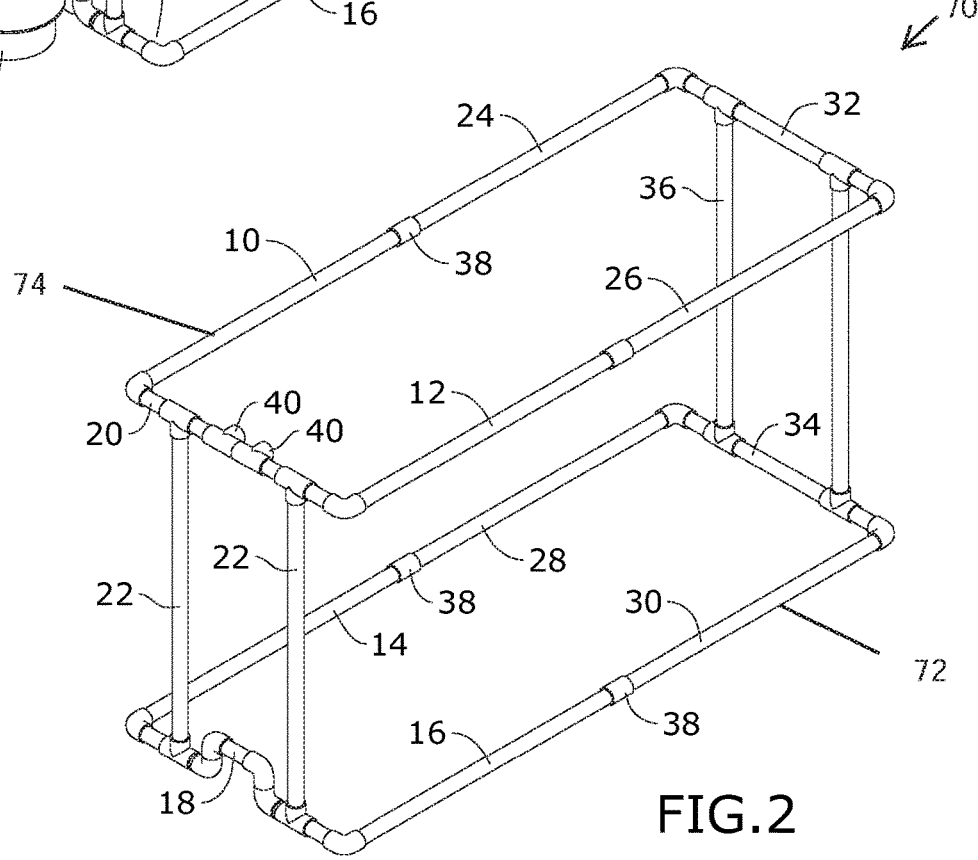
FIG. 2 is a perspective view of an exemplary embodiment of a frame of the present invention in the upright configuration.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a disposable animal bathing and grooming apparatus for the hygienic cleaning of animals.

Referring to FIGS. 1 through 10, the present invention may include a system embodying an apparatus 100 for washing and grooming animals. The apparatus 100 may include a collapsible, disposable container 42 supported in an upright condition by a frame 70. The disposable container 42 may be movable between the upright condition and a collapsed condition, when not supported by the frame 70. In the upright condition, the disposable container 42 may define a volumetric shape providing a cavity for receiving objects, such as an animal 64, and fluids, such as water, wherein the upright condition extends from a lower portion 66 to an upper portion providing an opening 68 communicating with the cavity, wherein the opening 68 receives the objects and fluids. The disposable container 42 may be a bag, thereby enabling the collapsed condition. The bag may be made from various water-proof, animal tear resistant materials, typically transparent. The disposable container 42 may be made of a flexible material.

The disposable container 42 may provide a pouch 46 between the lower and upper portion, along the exterior portion of the disposable container 42 opposite the cavity. Along the lower portion 66, the disposable container 42 provides a filter 44 adjustable between a closed position and an open position communicating to a lower portion of the cavity through an inlet and an outlet. The filter 44 may be adapted to filter solid materials including animal waste from the flow from the cavity. The disposable container 42 may have a closing mechanism (not shown) such as cinching straps for securely closing the opening 68.

The frame 70 may provide spaced apart vertical members 36 and 22 and spaced apart horizontal frames. The horizontal frames may include a lower horizontal frame 72 spaced apart from an upper horizontal frame 74. Each horizontal frame 72 or 74 may provide detachable connectors 38 so as to be movable between an operable configuration to a storage configuration, wherein each horizontal frame is separated into two detached portions. The vertical members 36 and 22 may interconnect the lower and upper horizontal frames 72 and 74 at pivotal connections 78 so that the frame 70 may be moveable between an upright configuration and a collapsed configuration when the horizontal frames are in the storage configuration, wherein the entire frame 70 takes on a planar orientation, as illustrated in FIG. 3.

The lower horizontal frame 72 may provide an arched portion 18 that provides a notch or void along the periphery of the lower horizontal frame 72. The horizontal frames may be formed from a plurality of bars 10, 12, 14, 16, 20, 24, 26 28, 30, 32 and 34, wherein the plurality of bars may be made of light-weight material that can be repeatedly subjected to bending stress without failing, such as polyethylene, polypropylene, vinyl, various plasticized materials and the like. The upper horizontal frame 74 may provide mounting connectors 40 for removably connecting various components.

The present invention may include a retaining member 48 dimensioned and adapted to removably sandwich the upper portion of the disposable container 42 along the periphery of the upper horizontal frame 74. In other embodiments, the removable connection between said upper portion and the upper horizontal frame 74 may be through conventional components, such as clips, snaps, hook and loop fasteners and the like.

Figure 3:
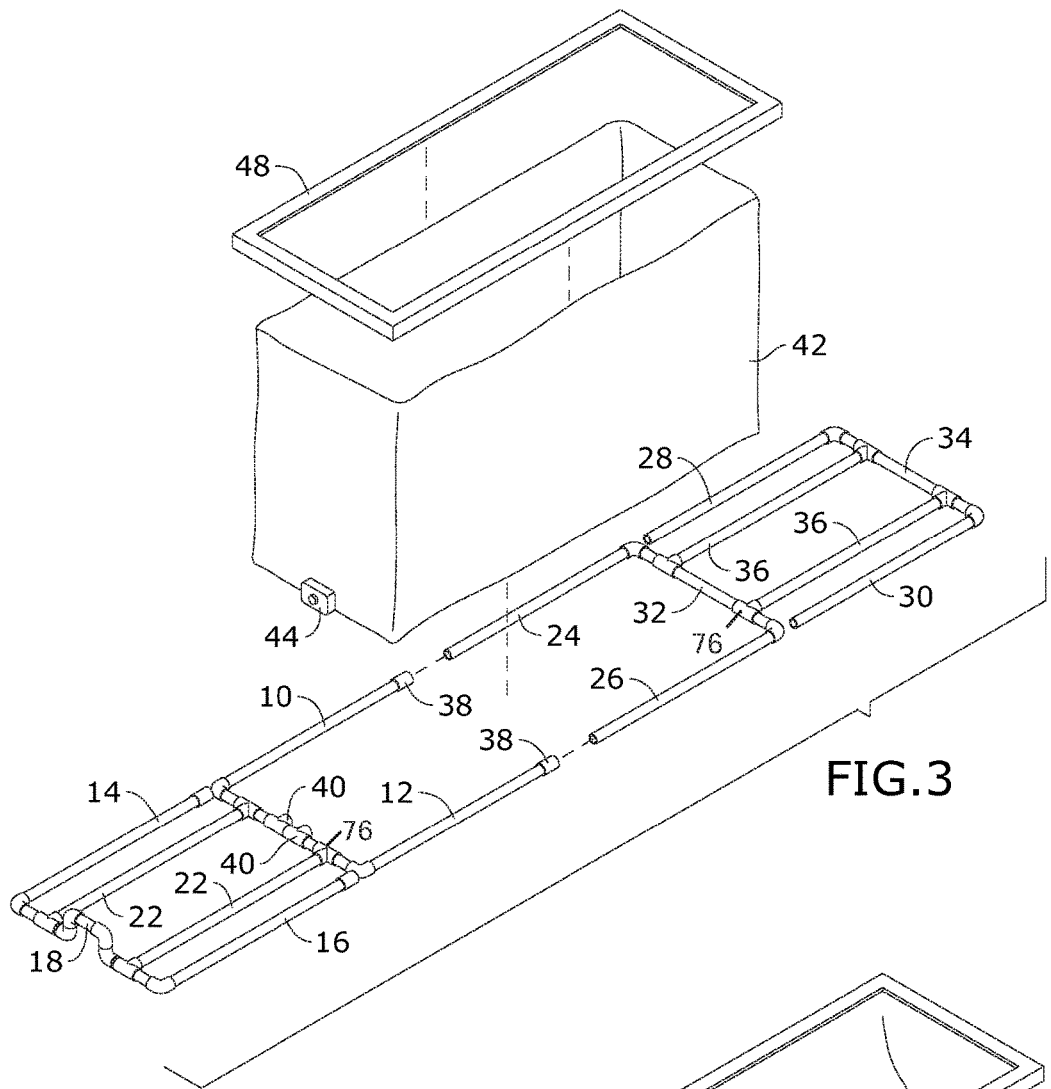
FIG. 3 is an exploded view of an exemplary embodiment of the present invention, illustrating the frame in a collapsed configuration and position.

Referring to FIG. 3, the assembly of the frame 70 and the disposable container 42 may include sandwiching said upper portion and the upper horizontal frame 74 in the operable configuration by way of the retaining member 48, and then lifting the upper horizontal frame 74 so that the lower horizontal frame 72 may be moved from the storage configuration to the operable configuration, wherein the filter 44 of the upright conditioned container 42 aligns with the notch defined by the arched portion 18.

Figure 9:
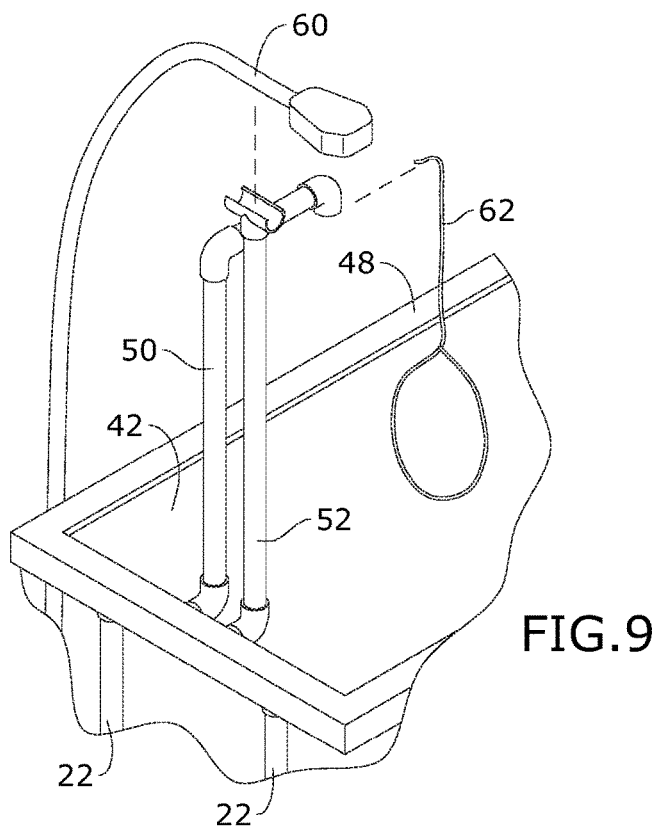
FIG. 9 is a detail perspective view of an exemplary embodiment of the present invention.

Referring to FIG. 9, in the upright condition, a restraint device 62, such as a leash, may be connected to a mounting connector 40 by way of an extender member 50. Similarly, a sprayer holder 52 may be connected to a mounting connector 40 so that a spraying device 60 may be retained while the frame 70 is in the upright configuration.

Figure 10:
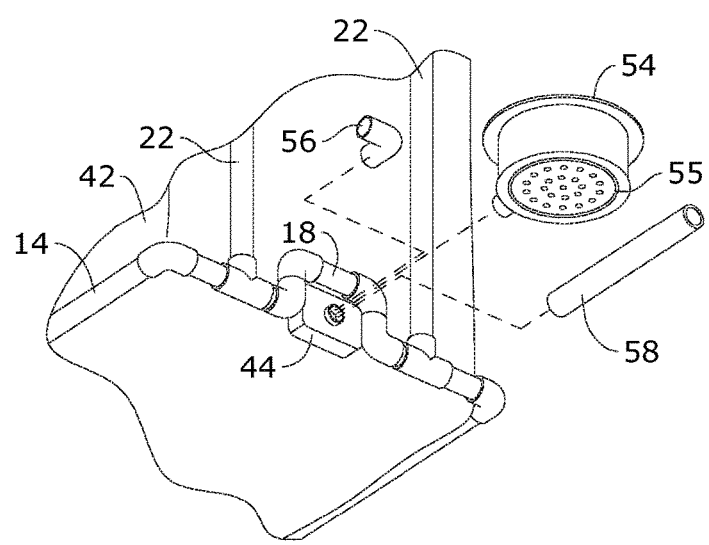
FIG. 10 is a reverse exploded view of an exemplary embodiment of the present invention, illustrating the multiple filter attachment options.

Referring to FIG. 10, the present invention may include a filter attachment 54 having a filter with a suction ring 55 for receiving flow from the outlet of the filter 44 in the open position. The suction ring 55 may be adapted to allow the filter attachment 54 to create an airtight adhesion between the attachment and the surface the attachment is attached to in order to prevent liquid from leaving the attachment and exposing the surrounding area to animal waste run-off. A drain hose 58 may be provided to removably attach to the filter 44, wherein the hose 58 fluidly communicate with the outlet of the filter 44 in the open portion and serves as funnels for directing run-off to an appropriate disposable location. The drain hose 58 may be curved, straight of the like. The drain hose may be connected in series with the pump 56.

Figure 4:
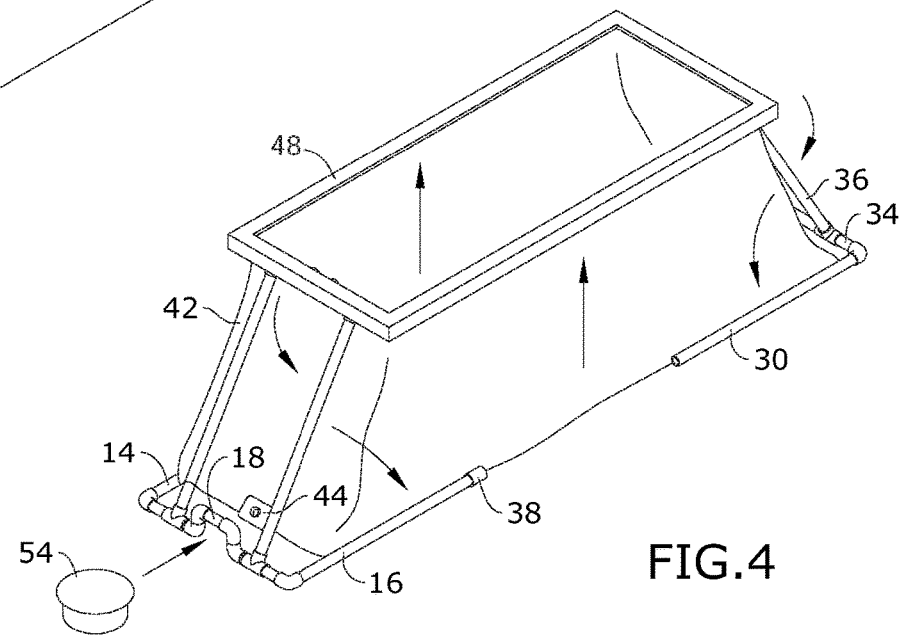
FIG. 4 is a perspective view of an exemplary embodiment of the present invention, illustrating moving the frame and a disposable container to an upright configuration and position.
Figure 5:
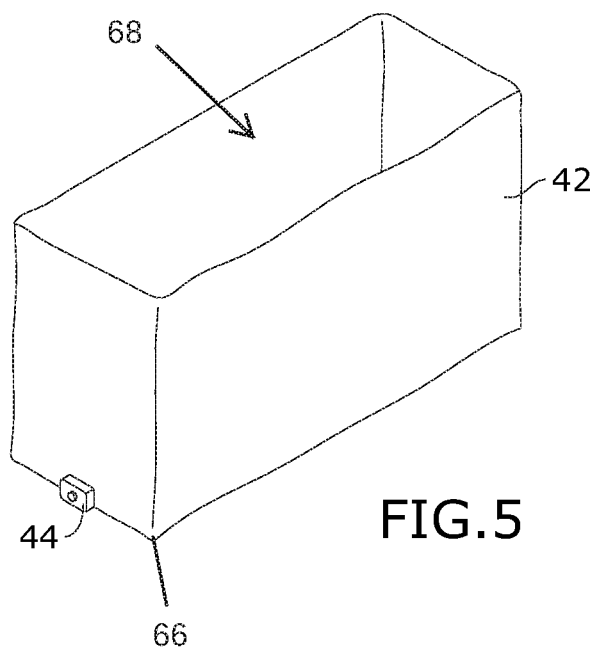
FIG. 5 is a front perspective view of an exemplary embodiment of a disposable container in the upright condition.
Figure 6:
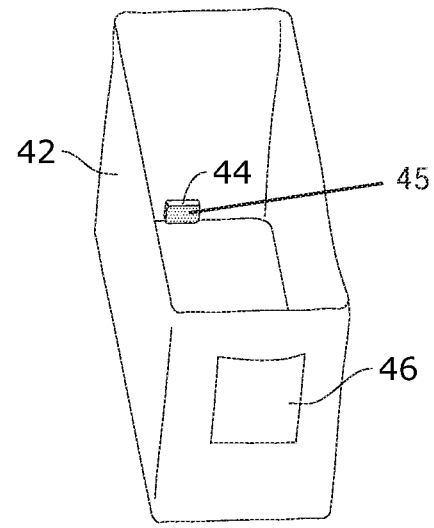
FIG. 6 is a top rear perspective view of an exemplary embodiment of the present invention, illustrating the disposable containers built-in filter and disposal pouch.
Figure 7:
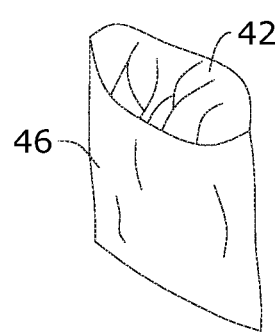
FIG. 7 is a top rear perspective view of an exemplary embodiment of a disposal pouch of the present invention.
Figure 8:
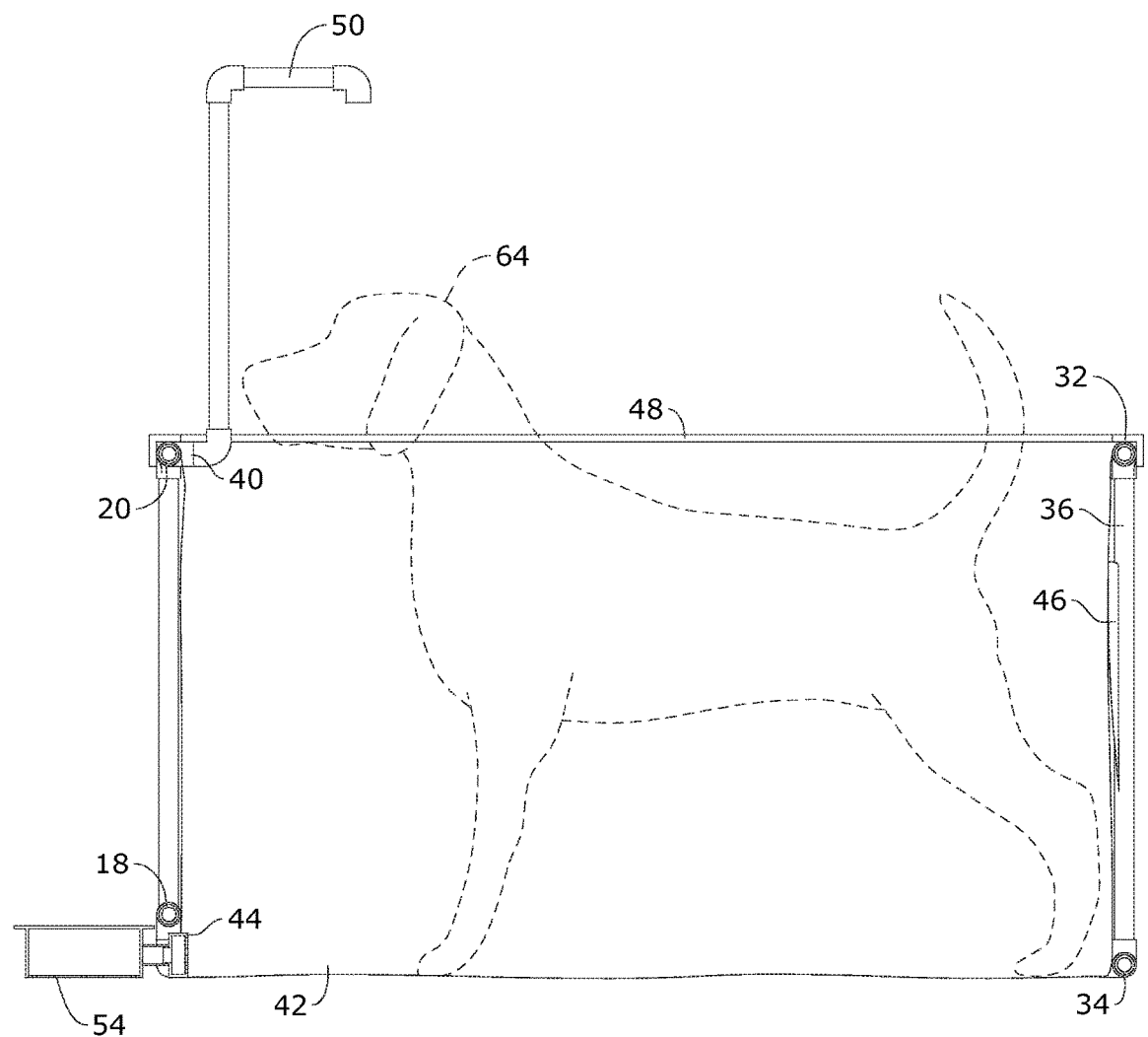
FIG. 8 is a section view of an exemplary embodiment of the present invention, taken along line 8-8 of FIG. 1.

A method of using the present invention may include the following. The apparatus 100 disclosed above may be provided. A user may assemble the apparatus 100 so that the frame 70 and disposable container 42 are in the upright configuration and position respectively. An animal 64 may be received through the opening 68 so as to be positioned in the cavity on the lower portion 66 of the container 42, typically centrally disposed. Alternatively, the animal may be positioned within the opening 68 while the disposable container 42 is laid flat (prior to the frame 70 moving to the upright configuration), and then the frame 70 and the disposable container 42 may be moved to the upright configuration and condition, as illustrated in FIG. 4. At this point bathing and/or grooming of the animal can commence usually using the spraying device 60.

While the animal 64 is being bathed and/or groomed, any non-liquid animal waste produced in the process of bathing and/or grooming the animal may be contained by the disposable container 42 through maintaining the filter 44 in the closed position, while any liquid animal waste produced in the process of bathing and/or grooming the animal flows through said filter 44 in the closed position. From the filter 44, via the drain hose 58, the resulting output flow may be direct to a desired location, such as a sink, drain or basin. Meanwhile, the disposable container 42 shields the surrounding area and user from water and waste during the bathing/grooming process.

Upon conclusion of bathing and/or grooming of the animal 64 the user may return the frame 70 to the collapsed configuration, while maintaining the disposable container 42 in a generally upright condition, possibly by utilizing the closing mechanism. The animals would then be removed from the collapsed disposable container 42. Once the animal 64 is removed, any remaining fluid from the disposable container 42 may be drained via the filter 44 by tilting the container 42 in the direction of the filter 44, thus allowing any remaining liquid to flow out of the disposable container 42 and into to a desired location. Alternatively, the filter 44 may be moved to the open position so as to expel a greater flow. Alternatively, a pump 56 may be attached to the filter thus pumping the contents out of the disposable container 42 and into a disposable location.

After any retaining member 48 and filter attachment 54 or drain hose 58 are removed, the user may utilize the closing mechanism and/or fold or collapse the disposable container 42 into its disposal pouch 46 with any animal-waste still in the disposable container 42 so that the disposable container 42 may be dispose of appropriately. The frame 70 may then be put in its collapsed configuration and stored in the storage configuration. Additionally, the present invention can be used as a disposable cleaning device for people and/or other types of objects.

An advantage of the disposable animal bathing and grooming apparatus is that its collapsible configuration eliminates the need to lift an animal into the apparatus, thus eliminating slip and fall accidents.

Another advantage of the disposable animal bathing and grooming apparatus is that its collapsible configuration eliminates the need to lift geriatric animals into the apparatus thus possibly injury to the animal by slips and falls.

Another advantage of the disposable animal bathing and grooming apparatus is the apparatus will shield the area surrounding where the bathing/grooming occurs from animal debris when an animal shakes its wet body and fur.

Another advantage of the disposable animal bathing and grooming apparatus is the portability of the apparatus allows bathing to take place with a dry shampoo which means bathing and grooming can take place away from a water source.

Another advantage of the disposable animal bathing and grooming apparatus is the disposable bag 42 shields the body and paws of the animal during cleaning. The paws are not shielded in U.S. Pat. No. 5,060,597.

Another advantage of the disposable animal bathing and grooming apparatus is it can be made in any size to accommodate the size of animal being bathed.

Another advantage of the disposable animal bathing and grooming apparatus is the invention allows animal bathers/groomers to continue to bath/groom animals using a basin configuration they are currently familiar with. Specifically, several configurations of this invention are similar to existing structures used to bath animals (i.e. bathtubs, sinks, etc.) and can be placed in familiar basins (i.e. bathtubs, sinks, etc.) during the cleaning process. This inventions familiar configuration eliminates the need for bathers/groomers to have to expend the time and effort to have to learn how to use new bathing and grooming techniques and apparatus.

Another advantage of the disposable animal bathing and grooming apparatus is the invention allows bathers/groomers to use the inventions filtering and attachment apparatus to direct animal bathing waste and run-off to a specific draining location.

Another advantage of the disposable animal bathing and grooming apparatus is the invention allows bathers/groomers to select bathing solutions (i.e. shampoo, conditioners, medications, pest control agents, scents, etc.) which best meet an animal's specific needs. The disposable bags with pretreated solutions of U.S. Pat. No. 8,307,787 eliminate a bather/groomers ability to take advantage of a wide array of solutions which meet an animal's specific need.

Another advantage of the disposable animal bathing and grooming apparatus is the invention allows bathers/groomers to use the configuration of the invention which may contains a pump 56 attachable to an outlet of the filter 44 so as to extend the number of locations where the bather/groomer can direct animal bathing run-off and waste.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus, comprising:
   a frame comprising:
   an upper horizontal frame;
   a lower horizontal frame; and
   a plurality of vertical members pivotably interconnecting the upper and the lower horizontal frames so that the frame is movable between an upright configuration and a collapsed configuration defined by a planar orientation;
   a disposable container extending from a lower portion to an upper portion, wherein said lower and upper portions define a cavity, the upper portion providing an opening to the cavity, wherein a periphery of the upper portion removably attaches along the upper horizontal frame, wherein the disposable container includes an opening therethrough and a first filter housed within the opening, wherein the first filter is adjustable between an open position and a closed position, wherein in the closed position, liquid inside the disposable container can pass through the first filter at a first rate and outside the disposable container while non-liquid material is contained in the disposable container, and in the open position, liquid inside the disposable container can pass through the first filter at a second rate and outside the disposable container while non-liquid material is contained in the disposable container, wherein the second rate is larger than the first rate
   and
   a filter attachment having a bottom surface and sidewalls extending from the bottom surface to form a container for containing liquid, wherein the filter attachment includes an opening in a sidewall for receiving liquid from the opening in the disposable container and a second filter housed in the bottom surface, and wherein the bottom surface includes a suction ring configured to create an airtight attachment to a surface, wherein the filter attachment is configured to connect to the opening in the disposable container so that the second filter is spaced apart from the disposable container.

2. The apparatus of claim 1, further comprising a retaining member dimensioned to removably sandwich the upper portion of the disposable container along a periphery of the upper horizontal frame.

3. The apparatus of claim 1, further comprising a pouch integrated into the disposable container, wherein the pouch is substantially less than coextensive with the disposable container it is integrated into, and wherein the disposable container is collapsible into the pouch.

4. The apparatus of claim 1, further comprising a sprayer holder connected to the upper horizontal frame so as to be adjacent to and upward relative to the opening in the upright configuration.

5. The apparatus of claim 1, further comprising a plurality of detachable connectors provided by each horizontal frame, so that each horizontal frame is movable between an operable configuration and a storage configuration.

6. The apparatus of claim 1, further comprising a restraint device connected to the upper horizontal frame so as to be adjacent to and upward relative to the opening when the upright configuration, wherein the restraint device is adapted to restrain an animal.

7. An apparatus, comprising:
   a frame comprising:
   an upper horizontal frame;
   a lower horizontal frame;
   a plurality of vertical members pivotably interconnecting the upper and the lower horizontal frames so that the frame is movable between an upright configuration and a collapsed configuration defined by a planar orientation; and
   a plurality of detachable connectors provided by each horizontal frame, so that each horizontal frame is movable between an operable configuration and a storage configuration;
   a disposable container extending from a lower portion to an upper portion
   wherein said lower and upper portions define a cavity, the upper portion providing an opening to the cavity, wherein the disposable container includes an opening therethrough and a first filter housed within the opening, wherein the first filter is adjustable between an open position and a closed position, wherein in the closed position, liquid inside the disposable container can pass through the first filter at a first rate and outside the disposable container while non-liquid material is contained in the disposable container, and in the open position, liquid inside the disposable container can pass through the first filter at a second rate and outside the disposable container while non-liquid material is contained in the disposable container, wherein the second rate is larger than the first rate;
   a retaining member dimensioned to removably sandwich the upper portion of the disposable container along a periphery of the upper horizontal frame;
   a sprayer holder connected to the upper horizontal frame so as to be adjacent to and upward relative to the opening when the frame is in the upright configuration;
   a restraint device connected to the upper horizontal frame so as to be adjacent to and upward relative to the opening when the frame is in the upright configuration, wherein the restraint device is adapted to restrain an animal;
   a filter attachment having a bottom surface and sidewalls extending from the bottom surface to form a container for containing liquid, wherein the filter attachment includes an opening in a sidewall for receiving liquid from the opening in the disposable container and a second filter housed in the bottom surface, and wherein the bottom surface includes a suction ring configured to create an airtight attachment to a surface, wherein the filter attachment is configured to connect to the opening in the disposable container so that the second filter is spaced apart from the disposable container.

8. An apparatus, comprising:
a frame movable between an upright configuration and a collapsed configuration defined by a planar orientation;
a disposable bag extending from a lower portion to an opening, the disposable bag removably attached along an upper portion of the frame, wherein the disposable bag includes an opening therethrough and a first filter housed within the opening, wherein the first filter is adjustable between an open position and a closed position, wherein in the closed position, liquid inside the disposable bag can pass through the first filter at a first rate and outside the disposable bag while non-liquid material is contained in the disposable bag, and in the open position, liquid inside the disposable bag can pass through the first filter at a second rate and outside the disposable bag while non-liquid material is contained in the disposable bag, wherein the second rate is larger than the first rate;
a restraint device connected to the upper portion of the frame so as to be adjacent to and upward relative to the opening when the frame is in the upright configuration, wherein the restraint device is adapted to restrain an animal; and
a filter attachment having a bottom surface and sidewalls extending from the bottom surface to form a container for containing liquid, wherein the filter attachment includes an opening in a sidewall for receiving liquid from the opening in the disposable bag and a second filter housed in the bottom surface, and wherein the bottom surface includes a suction ring configured to create an airtight attachment to a surface, wherein the filter attachment is configured to connect to the opening in the disposable bag so that the second filter is spaced apart from the disposable bag.

9. The apparatus of claim 8, further comprising a retaining member dimensioned to removably sandwich a periphery of the opening along a periphery of the upper portion of the frame.

10. The apparatus of claim 8, further comprising a pouch integrated into the disposable bag, wherein the pouch is substantially less than coextensive with the disposable container it is integrated into, and wherein the disposable bag is collapsible into the pouch.

11. The apparatus of claim 10, further comprising a sprayer holder connected to the upper portion of the frame so as to be adjacent to and upward relative to the opening in the upright configuration.

* * * * *